United States Patent Office 2,792,383
Patented May 14, 1957

2,792,383

METALLIFEROUS MONOAZO-DYESTUFFS

Arthur Buehler, Rheinfelden, and Christian Zickendraht, Binningen, Switzerland, assignors to Ciba Limited, Basel, Switzerland, a Swiss firm No Drawing. Application November 13, 1953, Serial No. 392,032

Claims priority, application Switzerland November 28, 1952

13 Claims. (Cl. 260—151)

This invention provides valuable new chromium or cobalt compounds of monoazo-dyestuffs which are free from sulfonic acid and carboxylic acid groups and correspond to the general formula

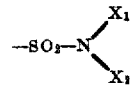

in which R represents an aromatic radical of the benzene series containing a hydroxyl group in ortho-position to the azo-linkage, and —R₁—OH represents the radical of a 1-hydroxynaphthalene sulfonic acid amide or sulfonic acid aryl ester capable of coupling in the 2-position, which monoazo-dyestuffs contain a sulfonic acid aryl ester group or at least one substituted sulfonic acid amide group and at most one unsubstituted sulfonic acid amide group, and which chromium or cobalt compounds contain less than one atom of chromium or cobalt bound in complex union per molecule of monoazo-dyestuff.

The invention also provides a process for the manufacture of the above chromium or cobalt compounds, wherein a monoazo-dyestuff, which is free from sulfonic acid and carboxylic acid groups and corresponds to the general formula (1) 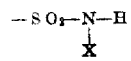

in which R represents an aromatic radical of the benzene series containing a hydroxyl group in ortho-position to the azo linkage, and —R₁—OH represents the radical of a 1-hydroxynaphthalene sulfonic acid amide or sulfonic acid aryl ester, and which dyestuff contains a sulfonic acid aryl ester group or at least one substituted sulfonic acid amide group and at most one unsubstituted sulfonic acid amide group, is treated with an agent yielding chromium or advantageously cobalt in such manner that the resulting metalliferous dyestuff contains less than one atom of metal bound in complex union per molecule of monoazo-dyestuff.

The monoazo-dyestuffs corresponding to the above Formula 1 and serving as starting materials in the process can be made by coupling an ortho-hydroxy-diazo-compound free from sulfonic acid and carboxylic acid groups with a 1-hydroxy-naphthalene sulfonic acid ester or amide free from sulfonic acid and carboxylic acid groups and capable of coupling in the 2-position, the naphthalene nucleus of which coupling component may, if desired, contain further substituents, advantageously sulfur-free substituents, such as halogen atoms (for example, chlorine) or arylamino groups (for example, a phenylamino group in the 8-position), and the sulfonic acid amide group of which coupling component must contain a substituent, if the diazo-compound used contains no sulfonic acid amide group or an unsubstituted sulfonic acid amide group. As substituted sulfonic acid amide groups there come into consideration mono- and di-substituted sulfonic acid amide groups, that is to say, radicals of the formula

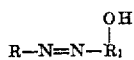

in which X₁ represents a hydrogen atom or an aliphatic radical, and X₂ represents an aliphatic, alicyclic, araliphatic or aromatic radical, or X₁ and X₂ together with —N— represent a heterocyclic radical; and advantageously radicals of the formula

in which X represents an alkyl or aryl radical.

The benzene radical of the diazo-component may contain, in addition to the amino group and hydroxyl group, further substituents, such as halogen atoms (for example, chlorine), alkyl groups (for example, methyl), alkoxy groups (for example, methoxy), nitro groups, —CO—alkyl groups (for example, —CO—CH₃), acylamino groups (for example, acetylamino) and above all sulfonic acid amide groups. The diazo-compounds of the following ortho-hydroxy-amines are especially useful: 4-methyl-2-amino-1-hydroxybenzene, 4-methoxy-2-amino-1-hydroxybenzene, 4-chloro-2-amino-1-hydroxybenzene, 4-nitro-2-amino-1-hydroxybenzene, 5-nitro-2-amino-1-hydroxybenzene, 6-acetyl-amino-4-chloro- or -4-nitro-2-amino-1-hydroxybenzene, 5-nitro-4-chloro-2-amino-1-hydroxybenzene, 6-nitro-4-chloro-2-amino-1-hydroxybenzene, 6-nitro-4-methyl-2-amino-1-hydroxybenzene, 3-amino-4-hydroxy-acetophenone, 6-nitro-4-acetyl-amino-2-amino-1-hydroxybenzene, 5-nitro-3-amino-4-hydroxy-acetophenone, 2-amino-1-hydroxybenzene-4-carboxylic acid amide, 4:6-dinitro-2-amino-1-hydroxybenzene, 4:6-dichloro-2-amino-1-hydroxybenzene, 4-nitro-6-chloro-2-amino-1-hydroxybenzene, 6-nitro- or 6-chloro-2-amino-1-hydroxybenzene-4-sulfonic acid-methylamide and especially 2-amino-1-hydroxybenzene-4-sulfonic acid-methyl-, -ethyl-, -isopropyl-, -butyl-, -β-hydroxyethyl- or -α-methyl-β-hydroxyethylamide, 2-amino-1-hydroxybenzene-4-sulfonic acid-dimethyl-, -diethyl- or -dihydroxyethylamide, 2-amino-1-hydroxybenzene-4-sulfonic acid-cyclohexylamide, 2-amino-1-hydroxybenzene-4-sulfonic acid-phenyl- or -N-methylphenylamide, 2-amino-1-hydroxybenzene-4-sulfonic acid-p-tolyl- or -p-chlorophenylamide, 2-amino-1-hydroxybenzene-4-sulfonic acid pyrrolidide and the corresponding 2-amino-1-hydroxybenzene-5-sulfonic acid amides, and above all ortho-hydroxy-aminobenzenes containing unsubstituted sulfonic acid amide radicals such as 6-chloro- or 6-nitro-2-amino-1-hydroxybenzene-4-sulfonic acid amide, 4-chloro- or 4-nitro-2-amino-1-hydroxybenzene-6-sulfonic acid amide, 4-chloro- or 4-methoxy-2-amino-1-hydroxybenzene-5-sulfonic acid amide and 2-amino-1-hydroxybenzene-4- or -5-sulfonic acid amide.

For the manufacture of the monoazo-dyestuffs there are used as coupling components 1-hydroxynaphthalenes capable of coupling in the 2-position, which contain two or advantageously one substituted sulfonic acid amide group or a sulfonic acid aryl ester group, and if desired a further substituent, advantageously one free from sulfur, for example, 1-hydroxynaphthalene-3:6-di-(sulfonic acid methylamide), 1-hydroxynaphthalene-3:8- or -4:8-di-(sulfonic acid ethylamide), 1-hydroxy-naphthalene-3-sulfonic acid anilide-8-sulfonic acid amide, 8-phenylamino-1-hydroxynaphthalene-5-sulfonic acid methyl- or phenyl-amide, but more especially 1-hydroxy-naphthalene-4-sulfonic acid methyl-, dimethyl-, ethyl-, isopropyl-, n-butyl-, phenyl-, 4'-chlorophenyl- or N-methyl-phenyl-amide, and the corresponding 1-hydroxynaphthalene-3- or -5-sulfonic acid amides, and furthermore 1-hydroxynaphthalene-3-, -4- or -5-sulfonic acid phenyl ester and 1-hydroxynaphthalene-3-, -4- or -5-sulfonic acid phenyl esters containing as a substituent in the phenyl radical an alkyl group or a halogen atom, such as 1-hydroxynaphthalene-4-sulfonic acid para-cresyl ester. There also come into consideration as coupling components 1-hydroxynaphthalenes which contain an unsubstituted sulfonic acid group such, for example as 4-chloro-1-hydroxynaphthalene-8-sulfonic acid amide, 7-chloro - 1 - hydroxynaphthalene-3-sulfonic acid amide, 8-chloro - 1 - hydroxynaphthalene-5-sulfonic acid amide and above all 1-hydroxynaphthalene-3-, -4- or -5-sulfonic acid amide. However, the latter coupling components are coupled only with such of the diazo-compounds hereinbefore mentioned as contain a substituted sulfonic acid amide group.

The coupling may be carried out by the usual known methods, advantageously in an alkaline medium, for example, a medium rendered alkaline with an alkali carbonate and/or an alkali hydroxide.

After the coupling reaction, the dyestuffs for the purpose of metallization can easily be isolated from the coupling mixture by filtration, since they are only sparingly soluble in water. They are advantageously used for the metallization in the form of filter cakes without intermediate drying. In some cases it is also possible to carry out the metallization without any intermediate separation, that is to say, directly in the coupling mixture.

The monoazo-dystuffs used as starting materials in the present process, and obtainable in the manner described above, are in general also not especially easily soluble in water in the form of their alkali compounds. However, some of them are sufficiently soluble in that form to enable them to be used for dyeing in dyebaths which contain no acid, for example, in accordance with the single bath chroming process.

The treatment with the agent yielding chromium or cobalt is carried out in accordance with the invention in such manner that a chromiferous or cobaltiferous dyestuff is obtained which contains less than one atom of chromium or cobalt in complex union per molecule of azo dyestuff. Accordingly, the metallization is advantageously carried out with such agents yielding chromium or cobalt and by such methods as lead to the formation of complex chromium or cobalt compounds having the aforesaid constitution.

It is in general of advantage to use less than one atomic proportion of chromium or cobalt for every molecular proportion of monoazo-dyestuff and/or to carry out the metallization in a weakly acid to alkaline medium. Consequently, those chromium or cobalt compounds are especially suitable for carrying out the present process which are stable towards the alkaline media, for example, complex chromium or cobalt compounds of aliphatic hydroxycarboxylic acids or dicarboxylic acids and complex chromium compounds of aromatic ortho-hydroxycarboxylic acids. As examples of aliphatic ortho-hydroxycarboxylic acids or dicarboxylic acids there may be mentioned, inter alia oxalic acid, lactic acid, glycollic acid, citric acid and especially tartaric acid and as aromatic ortho-hydroxy-carboxylic acids there may be mentioned -4-, -5- or -6-methyl-1-hydroxybenzene-2-carboxylic acid and above all 1-hydroxybenzene-2-carboxylic acid itself. As agents yielding cobalt there are also suitable simple compounds of divalent cobalt such as cobalt acetate or cobalt sulfate, and if desired, cobalt hydroxide.

The conversion of the dyestuffs into their complex chromium or cobalt compounds is advantageously carried out with the aid of heat, under atmospheric or superatmospheric pressure, for example, at the boiling temperature of the reaction mixture, and if desired, in the presence of suitable additions, for example, in the presence of salts of organic acids, or bases, organic solvents or other agents assisting the formation of the complexes.

In a special form of the process there is used as starting material a mixture of two different metallizable monoazodyestuffs both of which are free from sulfonic acid and carboxylic acid groups and of which at least one, but advantageously both, corresponds to the above general Formula 1. It will be understood that in this form of the process, also, the treatment with the agent yielding chromium or cobalt is carried out in such manner that chromiferous or cobaltiferous dyestuffs are obtained which contain less than one atom of chromium or cobalt bound in complex union per molecule of monoazo-dyestuff.

The products obtainable by the present process are new. They are complex chromium compounds or cobalt compounds, which contain more than one, and especially two, molecules of monoazo-dyestuff bound in complex union to one atom of chromium or cobalt, the monoazo-dyestuffs bound to the chromium or cobalt atom being free from sulfonic acid and carboxylic acid groups, and at least one of which dyestuffs, and advantageously both, corresponds to the general Formula 1.

Especially valuable are products of this kind which contain two identical monoazo-dyestuffs of the above Formula 1 bound in complex unison to one atom of cobalt.

The products are soluble in water and in weakly acid aqueous media, and are indeed more soluble than the metal-free parent dyestuffs used for making them. They are suitable for dyeing or printing a very wide variety of materials, above all for dyeing animal materials such as silk, leather and especially wool, but also for dyeing or printing synthetic fibers of superpolyamides or superpolyurethanes. In contradistinction to the chromium compounds of dyestuffs containing sulfonic acid groups, which are advantageously dyed from strong acid, for example, sulfuric acid baths, the new chromium and cobalt compounds of monoazo-dyestuffs free from sulfonic acid groups are especially suitable for dyeing from weakly alkaline, neutral or weakly acid, advantageously acetic acid, baths. The wool dyeings so obtained are distinguished by their good level character, good properties of wet fastness and very good fastness to light.

The following examples illustrate the invention, the parts and percentages being by weight unless otherwise stated and the relationship of parts by weight to parts by volume being the same as that of the kilogram to the liter:

*Example 1*

14.35 parts of 4-chloro-2-amino-1-hydroxybenzene are dissolved in 80 parts by volume of 2 N-hydrochloric acid, and diazotized at 4–6° C. with 25 parts by volume of a 4 N-solution of sodium nitrite. The diazo compound is neutralized by the addition of sodium carbonate, and the mixture is run into a solution, cooled with ice to 2° C., of 23.7 parts of 1-hydroxynaphthalene-4-sulfonic acid methylamide, 4 parts of sodium hydroxide and 5.3 parts of sodium carbonate in 150 parts of water. When the coupling is finished the precipitated dyestuff is filtered off and washed with sodium chloride solution. When dry it is a brown powder which dissolves in water with an orange coloration and in concentrated sulfuric acid with a violet coloration.

19.6 parts of the dyestuff so obtained are dissolved with the addition of 4 parts of sodium hydroxide in 1000 parts of water at 80° C., and mixed with 50 parts of cobalt sulfate solution having a cobalt content of 3.25 percent. After stirring for about ½ hour the metallization is complete. The cobalt complex is precipitated by the addition of sodium chloride and completely neutralized with acetic acid. When dry it is a black-brown powder dissolves in water with a blue-red coloration and in concentrated sulfuric acid with a violet coloration, and dyes wool equally well from a weakly alkaline, neutral or weakly acid bath full bordeaux red tints of good fastness to light, washing, decatizing and carbonization.

A similar cobaltiferous dyestuff is obtained by using 17.8 parts of 4:6-dichloro-2-amino-1-hydroxybenzene, instead of 4-chloro-2-amino-1-hydroxybenzene, and proceeding otherwise in the same manner.

Example 2

19.6 parts of the dyestuff obtained as described in the first paragraph of Example 1 are suspended in 750 parts of water and mixed with 70 parts of a solution of sodium chromosalicylate having a chromium content of 2.6 percent. After boiling the mixture for 4 hours under reflux the chroming is complete. The resulting chromium complex is precipitated by the addition of sodium chloride. When dry it is a violet powder which dissolves in water with a reddish blue coloration, and in concentrated sulfuric acid with a red-violet coloration, and dyes wool from a weakly alkaline, neutral or weakly acetic acid bath red violet tints.

Chromium dyestuff of a bluish bordeaux red tint is obtained by using in this example, instead of the aforesaid monoazo-dyestuff, the corresponding quantity of the dyestuff from diazotized 2-amino-1-hydroxybenzene-4-sulfonic acid amide and 1-hydroxynaphthalene-4-sulfonic acid isopropylamide while the chromium complex of the dyestuff from diazotized 2-amino-1-hydroxybenzene-5-sulfonic acid amide and 1-hydroxynaphthalene-4-sulfonic acid isopropylamide prepared in an analogous manner dyes wool reddish violet tints.

Example 3

18.8 parts of 2-amino-1-hydroxybenzene-4-sulfonic acid amide are dissolved in 75 parts of 2 N-hydrochloric acid, and diazotized at 4–6° C. with 25 parts by volume of a 4 N-solution of sodium nitrite. The diazo compound is neutralized with sodium carbonate, and the mixture is run into a solution, cooled to 0° C. with ice, of 29.9 parts of 1-hydroxynaphthalene-4-sulfonic acid anilide and 8 parts of sodium hydroxide in 100 parts of water. When the coupling is complete, the dyestuff formed is completely precipitated by the addition of sodium chloride and filtered off. When dry it is a brown powder which dissolves in water with a red coloration and in concentrated sulfuric acid with a bluish red coloration.

24.9 parts of the dyestuff so obtained are dissolved in 750 parts of hot water at 80° C. with the addition of 20 parts of tetrasodium pyrophosphate, and the solution is mixed with 50 parts of a cobalt sulfate solution having a cobalt content of 3.25 percent. After stirring for about ½ hour at 80° C. the metallization is finished. The cobalt complex so formed is completely precipitated by the addition of sodium chloride and filtered. When dry it is a dark powder which dissolves in water with a bluish red coloration and in concentrated sulfuric acid with a yellow-red coloration, and dyes wool equally well from a weakly alkaline, neutral or acetic acid bath bluish red tints having very good properties of wet fastness and of very good fastness to carbonization and decatization, and an excellent fastness to light.

Cobaltiferous dyestuffs having similar properties can be obtained by using in this example, instead of 18.8 parts of 2-amino-1-hydroxybenzene-4-sulfonic acid amide and 29.9 parts of 1-hydroxynaphthalene-4-sulfonic acid anilide, the corresponding quantities of 2-amino-1-hydroxybenzene-4-sulfonic acid anilide and 1-hydroxynaphthalene-4-sulfonic acid amide.

In the following table are given further cobalt complexes obtainable by this method. In column III are given the tints obtainable on wool and superpolyamide fibers with the cobalt complexes of the dyestuffs obtained from the components given in columns I and II.

| | I Diazo component | II Azo component | III Dyeing |
|---|---|---|---|
| 1 | 2-amino-1-hydroxybenzene-5-sulfonic acid amide (OH, NH₂, SO₂NH₂) | 1-hydroxynaphthalene-4-sulfonic acid methylamide (OH, SO₂NHCH₃) | blue red. |
| 2 | 2-amino-1-hydroxybenzene-5-sulfonic acid isopropylamide (OH, NH₂, SO₂NH–CH(CH₃)₂) | 1-hydroxynaphthalene-4-sulfonic acid methylamide (OH, SO₂NHCH₃) | Do. |
| 3 | 2-amino-1-hydroxybenzene-5-sulfonic acid isopropylamide (OH, NH₂, SO₂NH–CH(CH₃)₂) | 1-hydroxynaphthalene-4-sulfonic acid amide (OH, SO₂NH₂) | Do. |
| 4 | 2-amino-1-hydroxybenzene-4-sulfonic acid amide (OH, NH₂, SO₂NH₂) | 1-hydroxynaphthalene-4-sulfonic acid phenyl ester (OH, SO₂–O–C₆H₅) | Do. |
| 5 | 2-amino-1-hydroxybenzene-4-sulfonic acid amide (OH, NH₂, SO₂NH₂) | 1-hydroxynaphthalene-4-sulfonic acid isopropylamide (OH, SO₂–NH–CH(CH₃)₂) | Do. |
| 6 | 2-amino-1-hydroxybenzene-4,6-disulfonic acid diamide (OH, NH₂, SO₂NH₂, O₂S–NH₂) | 1-hydroxynaphthalene-4-sulfonic acid isopropylamide (OH, SO₂–NH–CH(CH₃)₂) | bordeaux. |
| 7 | 2-amino-1-hydroxybenzene-4-sulfonic acid methylamide (OH, NH₂, SO₂–NH–CH₃) | 1-hydroxynaphthalene-4-sulfonic acid amide (OH, SO₂NH₂) | Do. |

Example 4

0.5 part of the cobaltiferous dyestuff obtainable as described in the first and second paragraphs of Example 1 is dissolved in 4000 parts of water, 10 parts of crystalline sodium sulfate are added, and 100 parts of well wetted wool are entered into the resulting dyebath at 40–50° C. 2 parts of acetic acid of 40 percent strength are then added, the temperature is raised to the boil in the course of ½ hour and dyeing is carried on at the boil for ¾ hour. Finally the wool is rinsed with cold water and dried. There is obtained a level Bordeaux red dyeing of good fastness to light.

Practically the same dyeing is obtained when no acetic acid is added to the dyebath.

By using, instead of wool, a corresponding quantity of superpolyamide fibers (nylon fibers) a Bordeaux red dyeing is likewise obtained.

What is claimed is:

1. A complex metal compound containing one atom of one of the metals selected from the group consisting of chromium and cobalt bound in complex union with substantially two molecules of a monoazo dyestuff free from sulfonic and carboxylic acid groups which corresponds to the formula

wherein R represents a hydroxy benzene radical bound to the azo linkage in ortho-position relatively to the hydroxy group, and $R_1$—OH represents a 1-hydroxynaphthalene radical bound to the azo linkage in 2-position and containing a member selected from the class consisting of a sulfonic acid phenyl ester group and a sulfonic acid amide group containing at most 6 carbon atoms, the said monoazo dyestuff containing at most one

—$SO_2NH_2$— group and at least one member selected from the class consisting of a sulfonic acid phenyl ester group and a sulfonic acid amide group bearing a hydrocarbon radical of up to 6 carbon atoms.

2. A complex cobalt compound containing one atom of cobalt bound in complex union with substantially two molecules of a monoazo dyestuff of the formula

wherein R represents a hydroxybenzene radical free from sulfonic and carboxylic acid groups and bound to the azo linkage in ortho-position to the hydroxy group, $R_1$—OH represents a 1-hydroxynaphthalene radical bound to the azo linkage in 2-position and containing as substituent a sulfonic acid amide group containing a hydrocarbon radical of up to 6 carbon atoms.

3. A complex cobalt compound containing one atom of cobalt bound in complex union with substantially two molecules of a monoazo dyestuff of the formula

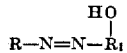

wherein R represents a hydroxybenzene radical free from sulfonic and carboxylic acid groups and bound to the azo linkage in ortho-position to the hydroxy group, X and one of the Y's both represent sulfonic acid amide groups of which at least one contains a hydrocarbon radical of up to 6 carbon atoms, the other Y being hydrogen.

4. A complex chromium compound containing one atom of chromium bound in complex union with substantially two molecules of a monoazo dyestuff of the formula

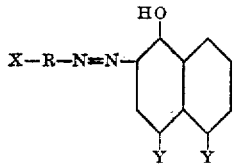

wherein R represents a hydroxy benzene radical free from sulfonic and carboxylic acid groups and bound to the azo linkage in ortho-position to the hydroxy group, X and one of the Y's both represent sulfonic acid amide groups of which at least one contains a hydrocarbon radical of up to 6 carbon atoms, the other Y being hydrogen.

5. A complex cobalt compound containing one atom of cobalt bound in complex union with substantially two molecules of a monoazo dyestuff of the formula

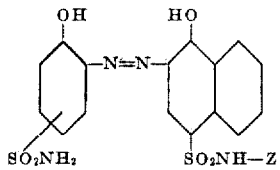

wherein Z represents a hydrocarbon radical of up to 6 carbon atoms.

6. A complex chromium compound containing one atom of chromium bound in complex union with substantially two molecules of a monoazo dyestuff of the formula

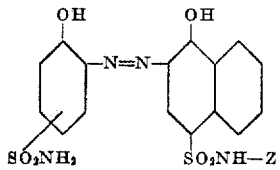

wherein Z represents a hydrocarbon radical of up to 6 carbon atoms.

7. A complex cobalt compound containing one atom of cobalt bound in complex union with substantially two molecules of a monoazo dyestuff of the formula

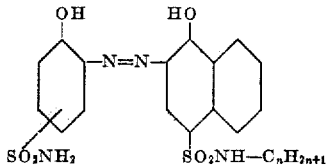

wherein n represents a whole number up to three.

8. A complex chromium compound containing one atom of chromium bound in complex union with substantially two molecules of a monoazo dyestuff of the formula

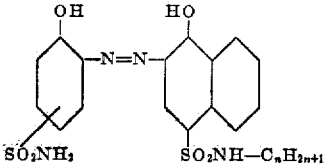

wherein n represents a whole number up to three.

9. The complex cobalt compound containing one atom of cobalt bound to substantially two molecules of the monoazo dyesuff of the formula

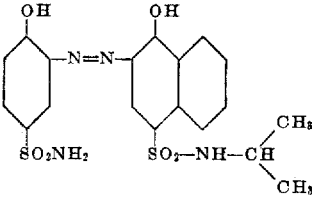

10. The complex cobalt compound containing one atom of cobalt bound to substantially two molecules of the monoazo dyestuff of the formula

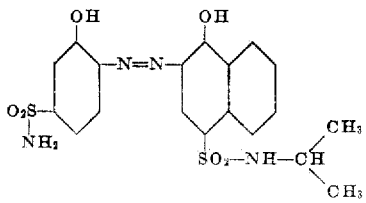

11. The complex cobalt compound containing one atom of cobalt bound to substantially two molecules of the monoazo dyestuff of the formula

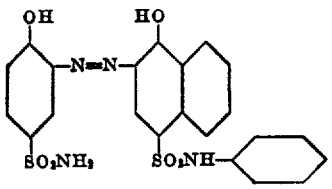

12. The complex cobalt compound containing one atom of cobalt bound to substantially two molecules of the monoazo dyestuff of the formula

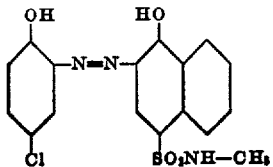

13. The complex chromium compound containing one atom of chromium bound to substantially two molecules of the monoazo dyestuff of the formula

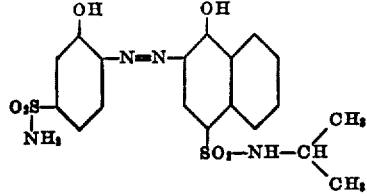

References Cited in the file of this patent
UNITED STATES PATENTS

| | | |
|---|---|---|
| 2,534,197 | Grimmel et al. | Dec. 12, 1950 |
| 2,565,898 | Widmer et al. | Aug. 28, 1951 |
| 2,673,199 | Widmer et al. | Mar. 23, 1954 |

UNITED STATES PATENT OFFICE

CERTIFICATE OF CORRECTION

Patent No. 2,792,383                            May 14, 1957

Arthur Buehler et al.

It is hereby certified that error appears in the printed specification of the above numbered patent requiring correction and that the said Letters Patent should read as corrected below.

Column 3, line 33, for "monoazo-dystuffs" read -- monoazo-dyestuffs --; column 4, line 26, for "unison" read -- union --; line 72, after "powder" insert -- which --.

Signed and sealed this 20th day of August 1957.

(SEAL)
Attest:

KARL H. AXLINE
Attesting Officer

ROBERT C. WATSON
Commissioner of Patents